Oct. 27, 1964  H. K. GEIGER  3,154,602
APPARATUS FOR THE AERATION OF LIQUIDS
Filed Jan. 30, 1961  2 Sheets-Sheet 1
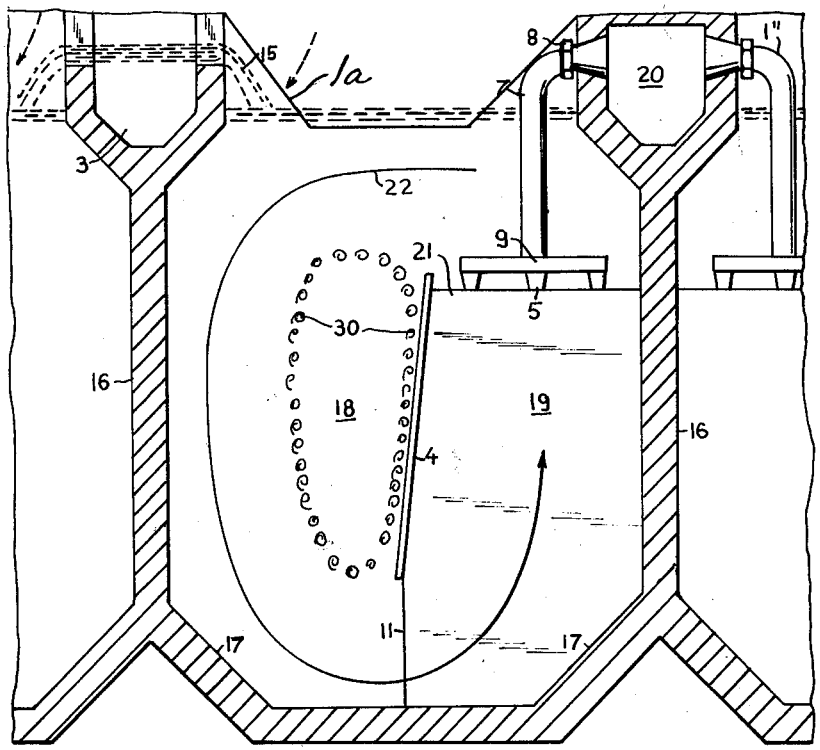
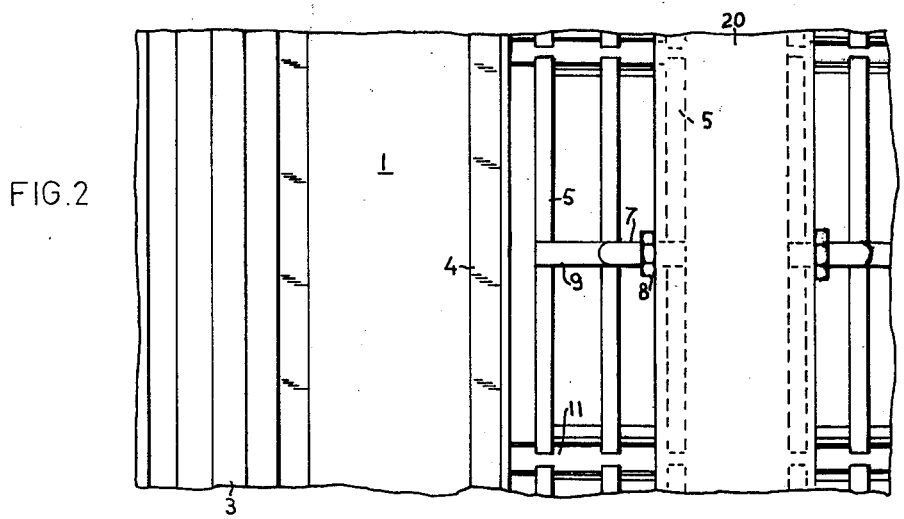
HELLMUT K. GEIGER
INVENTOR.
BY Oct. 27, 1964   H. K. GEIGER   3,154,602
APPARATUS FOR THE AERATION OF LIQUIDS
Filed Jan. 30, 1961   2 Sheets-Sheet 2
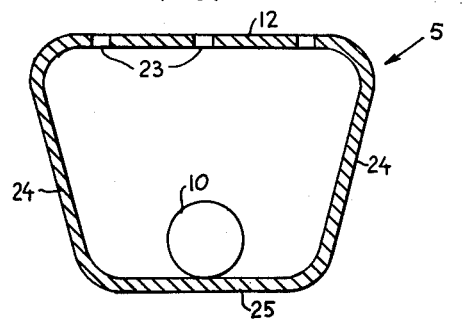
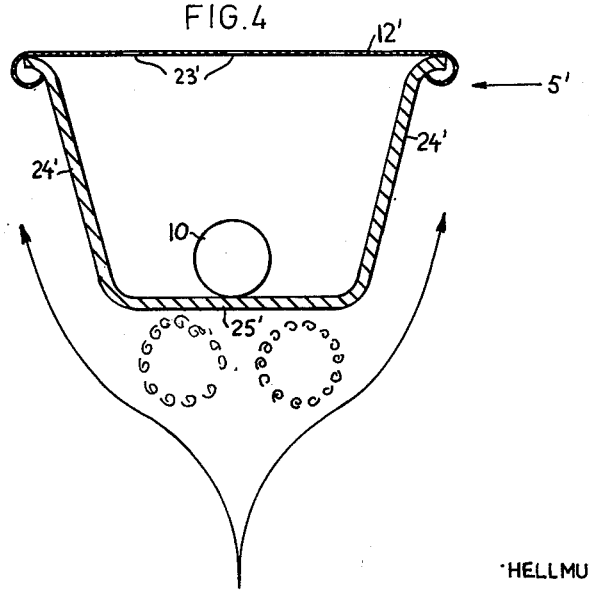
HELLMUT K. GEIGER
INVENTOR.
BY United States Patent Office 3,154,602
Patented Oct. 27, 1964

3,154,602
APPARATUS FOR THE AERATION OF LIQUIDS
Hellmut Karl Geiger, Hardeckstrasse 3,
Karlsruhe, Germany
Filed Jan. 30, 1961, Ser. No. 85,722
Claims priority, application Germany Feb. 6, 1960
12 Claims. (Cl. 261—123)

My present invention relates to apparatus for charging liquids with gases and, more particularly, to aeration facilities utilized in waste-disposal systems.

In waste-disposal systems for urban liquid wastes, and especially in activated-sludge sewage-treatment systems, the waste liquid is conventionally aerated in the presence of previously aerated biologically active sludge to accelerate the decomposition of waste materials. The aeration of the liquid, which generally entrains solid waste materials as it passes through the various processing steps of the treatment plant, is usually effected in an aeration tank of substantially rectangular cross-section and considerable length prior or subsequently to passing through a settling tank. The sludge derived from a post-aeration settling tank may then be recirculated to the aeration tank for further treatment with oxygen and to provide the required biologically active substances for treatment of subsequently processed quantities of fluid.

In conventional aeration tanks, large or small bubbles of an oxygen-containing gas are blown into the waste liquid from perforated tubes adjacent the floor of the aeration tank so that the contact between gas and liquid is sustained for a relatively long period, i.e., the time it takes for the bubbles to rise to the surface of the liquid. Since the quantity of oxygen dissolved in the waste liquid to participate in the biological decomposition of the waste material is a function of the contact-surface area between liquid and aeration gas, and of the duration of contact, relatively small bubbles having a proportionally large total surface area were preferred. The gas pipes at the floor of the tank were thus provided with gas diffusers adapted to produce a multiplicity of fine bubbles. Such bubbles, however, tended to become entrained by the flowing sewage so that there was substantially no relative movement between an air bubble and the liquid immediately surrounding it. Complete saturation of the surrounding liquid by the gas requires only about 0.25 second so that any additional period of contact between the gas and the liquid is ineffectual. It was, therefore, necessary to increase the turbulence of the flowing waste liquid in order to renew the liquid in contact with the bubbles as often as possible, thereby dissolving gas in the liquid during the entire period in which a gas bubble is surrounded by the latter. Furthermore, the recent use of large quantities of detergents in place of soap products has caused an increase in the viscosity of the waste liquids processed in sewage-treatment plants and, has, consequently, resulted in a decreased acceleration of the liquids by gas streams of given velocity. The sludge carried by the liquid often was deposited on the floor of the tank, owing to the decreased circulation, and could not, therefore, be thoroughly admixed with the liquid containing the dissolved oxygen, the efficiency of the system being thus lowered.

It is an object of my invention to provide improved apparatus for the aeration of liquid whereby the duration of contact between a gas and the liquid is considerably increased.

It is another object of the invention to provide an aeration tank for the treatment of sewage adapted to afford intimate contact between an aerating gas and the waste liquid and to obviate the aforementioned disadvantages of conventional aeration tanks.

It is a further, more specific object of the present invention to provide means for increasing the turbulence of a waste liquid by creating therein two fluid volumes with separate circulations, and transferring at least the major part of the circulation-promoting gas from the primary volume to the secondary volume so that the entire body of liquid is thoroughly and lastingly exposed to contact with the gas whereby the quantity of oxygen dissolved in the liquid with a given rate of aerating flow is considerably increased.

According to a feature of the invention, an elongated aeration tank of generally rectangular cross-section is provided with a sloping partition, which extends parallel to the longitudinal axis of the tank along the direction of liquid flow, subdividing the tank chamber over its entire length into two adjacent compartments which communicate with each other above and below the partition. The latter, which is inclined at an acute angle to the vertical, defines together with the longitudinal walls of the tank chamber a larger, downwardly converging compartment into which the waste liquid and entrained sludge flow from above, and a smaller, upwardly converging compartment whose width at the top of the partition is substantially less than that of the first compartment. A plurality of perforated conduits, fed from a source of gas under pressure, are disposed at the narrow mouth of the smaller compartment below the surface of the waste liquid so that this compartment constitutes a Venturi-type pump which establishes a primary circulation of the waste liquid about the longitudinal axis of the tank and transverse to the general flow direction of the sewage. The Venturi effect apparently derives from the ascending stream of gas bubbles which entrain the liquid at the relatively narrow mouth of the smaller compartment in an upward direction so that additional portions of the liquid are drawn into the latter compartment along the bottom of the tank and thence upwardly toward the mouth of this compartment.

The flow of increased velocity emanating from the mouth of the smaller compartment curves along the upper strata of the waste liquid to join the descending current traversing the downwardly converging larger compartment, thereby entraining the bubbles rising from the perforated conduits in the direction of the circulating liquid. The rate of gas discharge through the conduits is such that a major portion of the bubbles are drawn downward to the floor of the tank. The circulation of the liquid transverse to its flow direction produces a helical propagation of the waste material toward the discharge end of the tank which effectively removes settled sludge from the bottom thereof and admixes it thoroughly with the liquid-gas solution and mixture formed near the top portion of the liquid and in the downwardly moving current. The generally helical displacement of the water produces eddy currents along the walls of the tank, at the partition and in the central portion of the waste material which further increase the turbulence of the liquid and facilitate the dissolving of gas.

Thus, in contradistinction to hitherto existing sewage-treatment systems wherein the waste liquid passes through an array of aeration screens designed to provide a high degree of turbulence yet tending to become clogged by waste solid materials, aeration is accomplished by entraining air bubbles downwardly through an externally circulating primary volume of liquid and then permitting them to rise from below toward the surface and into engagement with an internally circulating secondary volume of liquid before they either escape into the atmosphere or are again drawn downwardly. The alternate rise and fall of the gas bubbles is promoted by the fact that the gas emission is limited to a cross-sectional area considerably narrower than half the width of the tank and located close to one of its longitudinal walls, this arrangement causing a circulation about the partition which is largely restricted to an outer tubular zone while leaving an inner core of the liquid substantially confined to the larger compartment on the side of the partition remote from the gas source. It is within this confined volume of liquid that the bubbles are free to ascend toward the surface of the liquid without being swept up by the external circulation, their rise occasioning a large relative motion between the gas and the liquid while the latter is being thoroughly agitated.

I have found that the desired relative movement between the gas bubbles and the immediately surrounding liquid is most effectively realized if the aeration apertures are relatively few in number and arrayed in several widely spaced rows parallel to the axis of the tank. Though the bubbles emanating from these apertures are somewhat larger than has heretofore been considered desirable, they will be found to mingle intimately with the relatively fast-moving waste stream and will thus tend to dissolve rapidly in the latter.

According to a further feature of the invention, I shape the aeration tubes in such manner as to obviate the formation of matted accumulations of the fibrous matter generally carried along with the waste stream. Instead of providing these tubes with rounded undersides to minimize their resistance to the ascending liquid flow, which would ordinarily be considered the most advantageous design, I prefer to give them a broad, substantially flat lower surface below which the oncoming fluid stream will generate inversely rotating eddy currents or whirls tending to disrupt any accumulation of solids. The apertured upper surface is conveniently made equally flat but wider whereby the cross-section of the tube will be generally trapezoidal, its upwardly diverging walls serving to deflect the rising flow away from the aeration apertures at the top so as to prevent their clogging. The said flanks may also have upper edges bent outwardly to intensify such deflection, in which case the apertured top wall of the tube may be curled in two longitudinal beads about these edges and may be relatively thin, preefrably with a thickness less than the diameter or width of the apertures, so that the tendency for solid wastes to clog the apertures will be still further reduced.

The above and other objects, features and advantages of my present invention will become more readily apparent from the following description, reference being made to the accompanying drawing in which:

FIG. 1 is a cross-sectional view of an aeration tank according to the invention, taken in a plane transverse to the direction of waste flow;

FIG. 2 is a patrial top-plan view of the tank;

FIG. 3 is a cross-sectional view through an aeration tube according to one embodiment of the invention; and FIG. 4 is a view similar to FIG. 3 of a modified aeration tube.

In FIGS. 1 and 2 I show an aeration tank 1 whose longitudinal vertical walls 16 separate it from other, similar tanks 1' and 1" of an aeration battery in a sewage-treatment plant not further illustrated. One of the walls 16 is formed along its top edge with a feeding trough 3 adapted to discharge a flow of liquid waste 15 into the tank. The main outlet of the tank is a conventional spillway 1a. The tank 1, whose bottom corners are beveled at 17 to minimize the possibility that sludge might accumulate at the bottom during the helical agitation of the waste liquid 15, is provided with a partition or baffle plate 4, fixedly positioned by the transverse walls 11 of the tank, below the level of the liquid. Plate 4, which extends parallel to the longitudinal axis of the tank and to the direction of liquid flow, is offset from and inclined relatively to the median vertical plane of the tank chamber so as to subdivide it into a downwardly converging compartment 18 and an upwardly converging compartment 19 which is of smaller capacity than compartment 18; it will also be noted that the lower edge of this plate is spaced from the bottom of the tank by a distance less than the width of compartment 19 at its mouth 21.

In the region of mouth 21, three longitudinal aeration tubes 5, whose construction will be described with reference to FIGS. 3 and 4, rest upon the support walls 11 and are connected together by one or more manifold pipes 9 supplied with air via a standpipe 7 from an air conduit 20 in the upper portion of the other wall 16. Standpipe 7 is removably connected to the conduit 20 by a coupling 8 which may be disengaged to permit the removal of the entire aeration assembly 5, 9 and 7 from the tank for cleaning or replacement.

In operation, an aeration gas is blown upwardly through the apertures of the tubes 5, thereby carrying waste liquid 15 in a vertically ascending current through the mouth 21 of nozzle or Venturi compartment 19. A rotary external circulation of the liquid in the direction of arrow 22 is thus established so that the liquid rises from compartment 19, crosses the top of partition 4 and then descends along the outer wall of compartment 18 toward the bottom whereupon it re-enters compartment 19 below the partition. A substantial portion and, indeed, most of the gas bubbles rising from the aeration apertures are drawn along with the descending current toward the bottom of the tank and thereupon ascend along partition 4 to the mouth of compartment 18, thereby traversing a body of liquid which does not partake of the circulation through compartment 19. The helical displacement of the liquid about and in the general direction of the tank axis gives rise to eddy currents and whirls along the surfaces of the tank and within its interior to disperse the entrained gas through the liquid: little whirlpools with individual circulations, indicated at 30, are formed within the independently rotating inner liquid volume in compartment 18 at the locations of greatest gas concentrations.

In FIG. 3 I show an aeration tube 5 in greater detail. Tube 5 comprises an upper plate 12 formed with aeration apertures 23 of relatively large cross-sectional area, a pair of upwardly diverging side walls 24, and a bottom plate 25. The generally trapezoidal configuration of the tube 5 prevents fibrous material from accumulating either on the underside of the tube or in the region of the apertures 23. The apertures 23 are of a diameter greater than the thickness of the plate 12. The tube 5' shown in FIG. 4 likewise is formed with side walls 24' and a bottom plate 25'. The bottom plates 25, 25' induce the formation of a pair of whirls or eddy currents immediately thereunder and deflect the ascending current of liquid away from the tubes 5 and 5'. These whirls or eddy currents tend to prevent the formation of fibrous mats. The upper edges of plates 24' are shown to be flanged outwardly and to engage the turned-under longitudinal edges of the sheet-metal top plate 12', formed with apertures 23', which is slidable along the tube 5' in order to facilitate its removal for cleaning or replacement. In contradistinction to the tube 5, all of whose walls 12, 24 and 25 are of identical thickness, the tube 5' has walls 24' and 25' of relatively large thickness while the plate 12' is considerably thinner. For convenience the plate 12' may be of a material different from that constituting the remainder of the tube 5' and, more particularly, of one which is mechanically stronger and highly resistant to chemical attack, such as stainless steel, rather than cast iron or the like which may be used for the walls 24' and 25'. The tubes 5 and 5' are formed with outlet openings 10 in their transverse end walls whereby liquid accumulating in the tubes may be discharged when the tank is drained.

The invention described and illustrated is believed to admit of many modifications and variations deemed to be within the ability of persons skilled in the art and intended to be included within the spirit and scope of the invention as defined in the appended claims.

I claim:

1. An apparatus for aerating liquids, comprising a housing forming a chamber for a liquid, partition means within said chamber below the level of said liquid subdividing said chamber into a downwardly diverging first compartment and an adjacent upwardly diverging second compartment communicating with each other above and below said partition means, said compartments being of substantially equal width at the bottom of said chamber and duct means extending below the level of said liquid and having top openings for introducing a gas stream upwardly into said chamber at substantially the top of said partition means in said first compartment, thereby inducing a generally rotary external circulation of said liquid upwardly out of said first compartment and downwardly into said second compartment along with an internal circulation within said second compartment, said partition means being spaced from said bottom of said chamber by a distance less than the width of said second compartment at said bottom, said partition means extending sufficiently far toward the bottom of said chamber to divert at least part of said gas stream from said external circulation to said internal circulation near the bottom of said second compartment.

2. An apparatus for aerating liquids, comprising a housing forming an elongated chamber of generally rectangular cross-section for traversal by a liquid, partition means within said chamber below the level of said liquid subdividing said chamber into a downwardly diverging first compartment and an adjacent upwardly diverging second compartment communicating with each other above and below said partition means, said compartments being of substantially equal width at the bottom of said chamber, inlet means for introducing a continuous flow of said liquid into said second compartment, said chamber being provided with an outlet spaced from said inlet means, and duct means extending below the level of said liquid and having top openings for introducing a gas stream upwardly into said chamber at the top of said first compartment, thereby inducing a generally helical external circulation of said liquid upwardly out of said first compartment and downwardly into said second compartment toward said outlet along with an internal circulation within said second compartment, said partition means being spaced from said bottom of said chamber by a distance less than the width of said second compartment at said bottom.

3. An apparatus for aerating liquids, comprising a housing forming an elongated chamber of generally rectangular cross-section for traversal by a liquid, a partition below the level of the liquid and spaced above the floor of said chamber at a location offset from the median vertical plane thereof and inclined relatively to said plane, said partition extending over the full length of said chamber and dividing it into a downwardly diverging first compartment and an adjacent upwardly diverging second compartment communicating with each other above and below said partition, said compartments being of substantially equal width at the bottom of said chamber and duct means extending below the level of said liquid and having top openings for introducing a gas stream into said chamber in said first compartment, thereby inducing a generally rotary external circulation of said liquid upwardly out of said first compartment and downwardly into said second compartment along with an internal circulation within said second compartment, said partition means being spaced from said bottom of said chamber by a distance less than the width of said second compartment at said bottom.

4. An apparatus for aerating liquids, comprising a housing forming an elongated chamber of generally rectangular cross-section for traversal by a liquid, a partition below the level of the liquid and spaced above the floor of said chamber at a location offset from the median vertical plane thereof and inclined relatively to said plane, said partition extending over the full length of said chamber and dividing it into a downwardly diverging first compartment and an adjacent upwardly diverging second compartment communicating with each other above and below said partition, inlet means for introducing a continuous flow of said liquid through said second compartment, said compartments being of substantially equal width at the bottom of said chamber, said chamber being provided with an outlet spaced from said inlet means, and duct means extending below the level of said liquid and having top openings for introducing a gas stream into said chamber in said first compartment, thereby inducing a generally helical external circulation of said liquid upwardly out of said first compartment and downwardly into said second compartment toward said outlet along with an internal circulation within said second compartment, said partition means being spaced from said bottom of said chamber by a distance less than the width of said second compartment at said bottom.

5. An apparatus for aerating liquids, comprising a housing forming a chamber for a liquid, a partition within said chamber below the level of said liquid subdividing said chamber into a downwardly diverging first compartment and an adjacent upwardly diverging second compartment communicating with each other above and below said partition, at least one duct in said chamber below the level of said liquid extending parallel to said partition means at the top of said first compartment, said compartments being of substantially equal width at the bottom of said chamber, and conduit means for feeding a stream of aerating gas to said duct, thereby inducing a generally rotary external circulation of said liquid upwardly out of said first compartment and downwardly into said second compartment along with an internal circulation within said second compartment, said duct having substantially planar upper and lower walls and being provided at its upper wall with a row of outlet apertures for the upward discharge of gas, the diameters of said apertures substantially exceeding the thickness of said upper wall.

6. An apparatus according to claim 5 wherein said duct is of substantially trapezoidal cross-section with its major base at said upper surface, said duct being provided with side walls having outwardly curved upper edges.

7. An apparatus according to claim 5 wherein said upper wall has a thickness substantially less than that of its side and bottom walls.

8. An apparatus according to claim 7 wherein said upper wall is removably secured to said side walls.

9. An apparatus according to claim 7 wherein said upper wall consists of a material whose mechanical strength and chemical resistance substantially exceed those of the material of said side and bottom walls.

10. An apparatus according to claim 5 wherein said duct is provided with a transverse end wall formed with an outlet opening for the drainage of liquid entering said duct.

11. An apparatus for aerating liquids, comprising a housing forming an elongated chamber of generally rectangular cross-section for traversal by a liquid, a partition below the level of the liquid and spaced above the floor of said chamber at a location offset from the median vertical plane thereof and inclined relatively to said plane, said partition extending over the full length of said chamber and dividing it into a downwardly diverging first compartment and an adjacent upwardly diverging second compartment communicating with each other above and below said partition, said compartments being of substantially equal width at the bottom of said chamber, inlet means for introducing a continuous flow of said liquid through said second compartment, said chamber being provided with an outlet spaced from said inlet means, a plurality of ducts in said chamber below the level of said liquid spacedly extending parallel to said partition at the top of said first compartment, and conduit means for feeding a stream of aerating gas to said ducts, thereby inducing a generally rotary external circulation of said liquid upwardly out of said first compartment and downwardly into said second compartment along with an internal circulation within said second compartment, said ducts having substantially flat upper and lower walls and being each provided at its upper wall with a row of outlet apertures for the upward discharge of gas, the diameters of said apertures substantially exceeding the thickness of said upper wall.

12. An apparatus for aerating liquids, comprising a housing forming an elongated chamber of generally rectangular cross-section for traversal by a liquid, partition means within said chamber below the level of said liquid subdividing said chamber into a downwardly diverging first compartment and an adjacent upwardly diverging second compartment communicating with each other above and below said partition means, inlet means for introducing a continuous flow of said liquid into said second compartment, said compartments being of substantially equal width at the bottom of said chamber, said chamber being provided with an outlet spaced from said inlet means, and a plurality of ducts spacedly extending in said chamber along the upper edge of said partition parallel thereto in said first compartment, said ducts having upwardly facing apertures for introducing a gas stream into said chamber, thereby inducing a generally helical external circulation of said liquid upwardly out of said first compartment and downwardly into said second compartment toward said outlet along with an internal circulation within said second compartment, said partition means being spaced from said bottom of said chamber by a distance less than the width of said second compartment at said bottom.

References Cited in the file of this patent

UNITED STATES PATENTS

| | | |
|---|---|---|
| 1,401,535 | Gross et al. | Dec. 27, 1921 |
| 1,912,630 | Forrester | June 6, 1933 |
| 2,081,382 | Piatt | May 25, 1937 |
| 2,708,571 | Fischerstrom et al. | May 17, 1955 |
| 2,792,202 | Griffith | May 14, 1957 |

FOREIGN PATENTS

| | | |
|---|---|---|
| 105,654 | Great Britain | Apr. 26, 1917 |
| 239,271 | Great Britain | Sept. 2, 1925 |